(12) United States Patent
Kuemmel et al.

(10) Patent No.: US 10,550,934 B2
(45) Date of Patent: Feb. 4, 2020

(54) HYDROSTATIC TRANSMISSION AND METHOD FOR BRAKING USING THE SAME

(71) Applicant: Robert Bosch GmbH, Stuttgart (DE)

(72) Inventors: Bernhard Kuemmel, Neu-Ulm (DE); Martin Behm, Ulm (DE); Michael Mast, Schemmerhofen (DE)

(73) Assignee: Robert Bosch GmbH, Stuttgart (DE)

( * ) Notice: Subject to any disclaimer, the term of this patent is extended or adjusted under 35 U.S.C. 154(b) by 172 days.

(21) Appl. No.: 15/895,177

(22) Filed: Feb. 13, 2018

(65) Prior Publication Data

US 2018/0231123 A1    Aug. 16, 2018

(30) Foreign Application Priority Data

Feb. 14, 2017 (DE) .......................... 10 2017 202 272
May 5, 2017 (DE) .......................... 10 2017 207 569

(51) Int. Cl.
*F16H 61/4157* (2010.01)
*F16H 39/10* (2006.01)
*F16H 61/4017* (2010.01)
*F16H 61/433* (2010.01)
*F16H 61/47* (2010.01)
*F16H 59/44* (2006.01)
*F16H 59/36* (2006.01)

(52) U.S. Cl.
CPC ......... *F16H 61/4157* (2013.01); *F16H 39/10* (2013.01); *F16H 61/4017* (2013.01); *F16H 61/433* (2013.01); *F16H 61/47* (2013.01); *F16H 59/44* (2013.01); *F16H 2059/366* (2013.01)

(58) Field of Classification Search
CPC ... F16H 61/4017; F16H 61/4157; F16H 61/42
See application file for complete search history.

(56) References Cited

U.S. PATENT DOCUMENTS 3,775,981 A * 12/1973 Molly ................... F01B 3/0035
                                                                        60/490
3,884,039 A *  5/1975 Pourian ................ F04B 49/002
                                                                        60/445

(Continued)

FOREIGN PATENT DOCUMENTS

DE    10 2014 211 393 A1    12/2014
DE    10 2014 211 394 A1    12/2014
EP        1 960 699 B1      5/2011

*Primary Examiner* — F Daniel Lopez
*Assistant Examiner* — Matthew Wiblin
(74) *Attorney, Agent, or Firm* — Maginot, Moore & Beck LLP

(57) ABSTRACT

A hydrostatic transmission is configured to realize a braking operation in which at least one adjustable traction motor, which acts as a pump, is supported via a closed circuit on an adjustable axial piston pump, which acts as a motor, and which in turn is supported on an internal combustion engine. Since overspeeding of the latter should be avoided, a control unit adjusts the pivot angle of the pump in accordance with a characteristic map which represents a relationship between a setting force and a pressure difference of two working lines of a closed circuit, a pump rotational speed, and the pivot angle. Thus, characteristic-map-based pilot control of the pivot angle of the pump is possible and feedback of the present pivot angle is omitted.

14 Claims, 4 Drawing Sheets

(56) References Cited

U.S. PATENT DOCUMENTS

| | | | | |
|---|---|---|---|---|
| 4,364,230 | A | * | 12/1982 | Holmes ............... F16H 61/4157 417/217 |
| 4,382,360 | A | * | 5/1983 | Dummer ................ F16H 61/40 60/444 |
| 4,400,939 | A | * | 8/1983 | Moranduzzo ........... F16H 61/42 60/431 |
| 5,335,750 | A | * | 8/1994 | Geringer ................ B60K 17/10 180/307 |
| 6,338,247 | B1 | * | 1/2002 | Drin ....................... B60T 1/093 60/466 |
| 2007/0119163 | A1 | * | 5/2007 | Tatsuno .......... B60W 30/18072 60/493 |
| 2014/0372000 | A1 | * | 12/2014 | Rozycki ................ F16H 61/421 701/58 |
| 2015/0219213 | A1 | * | 8/2015 | Neumann ............... F16H 61/20 701/50 |
| 2016/0312888 | A1 | * | 10/2016 | Schmuttermair ....... F16H 61/42 |
| 2017/0198812 | A1 | * | 7/2017 | Girard ................... B60K 23/00 |

* cited by examiner

HYDROSTATIC TRANSMISSION AND METHOD FOR BRAKING USING THE SAME

This application claims priority under 35 U.S.C. § 119 to (i) patent application no. DE 10 2017 207 569.4, filed on May 5, 2017 in Germany, and (ii) patent application no. DE 10 2017 202 272.8, filed on Feb. 14, 2017 in Germany. The disclosures of the above-identified patent applications are both incorporated herein by reference in their entirety.

The disclosure relates to a hydrostatic transmission with which a hydrostatic braking operation is possible, as disclosed herein, and to a method for braking with a hydrostatic transmission of said type.

BACKGROUND

The prior art has disclosed hydrostatic transmissions for mobile working machines in which a hydrostatic pump (primary unit) and at least one hydrostatic motor (secondary unit) are fluidically connected to one another by means of a closed hydraulic circuit. A primary unit may be situated with multiple secondary units in a closed hydraulic circuit, wherein the secondary units are arranged in parallel with respect to one another in terms of the circuit configuration. An internal combustion engine, for example a diesel engine of the mobile working machine, is coupled rotationally conjointly to the primary unit, and an output, for example an axle or a wheel of the mobile working machine, is coupled rotationally conjointly to the secondary unit. The mobile working machine thus has a traction drive which has a hydrostatic transmission.

The document EP 1 960 699 B1 discloses a hydrostatic transmission of said type, with which braking can also be performed. Here, in relation to traction operation, the power flows in the reversed direction from the output, via the secondary unit acting as a pump and via the primary unit acting as a motor, to the internal combustion engine, which is then driven in a passive cranking operating mode. The highly pressurized working line of the closed circuit is in this case safeguarded by means of a pressure-limiting valve, by means of which, too, a part of the braking power can be dissipated during the braking operation.

A problem during such braking operations is that the internal combustion engine may be driven only with a maximum rotational speed in order that it is not destroyed. Therefore, the primary unit, which is designed as an adjustable axial piston machine and which operates as a motor, is, during the braking operation, set to a pivot angle at which a torque is generated that can still be supported by the internal combustion engine without the latter being caused to overspeed. This occurs taking into consideration the pressure determined in the working line by the setting of the pressure-limiting valve.

The documents DE 10 2014 211 393 A1 and DE 10 2014 211 394 A1 each likewise disclose a hydrostatic transmission with which braking can also be performed, wherein it is sought to protect the internal combustion engine against overspeeding. A first part of the braking power is output via the primary unit to the internal combustion engine, whereas a second part of the braking power is converted by means of the pressure-limiting valve of the high-pressure line in question into heat. Here, a rotational speed of the internal combustion engine which is initially slightly higher than the admissible rotational speed limit is accepted.

The respective primary units of the stated prior art are subjected to closed-loop pivot angle control. For this purpose, they require feedback of their present pivot angle. Furthermore, in the context of the pilot control of the pivot angle, a pivot angle that is generally higher than the ideal pivot angle is disclosed.

By contrast to this, the disclosure is based on the object of providing a hydrostatic transmission and a method, in which the pivot angle and thus the swept volume (during braking operation, this is a displacement volume) of the primary unit are optimally controlled, or controlled in closed-loop fashion, such that the rotational speed of the internal combustion engine is brought to its maximum rotational speed as quickly as possible and is held as close as possible to this maximum rotational speed. Here, the internal combustion engine should not exceed its maximum rotational speed at any time.

Furthermore, the outlay in terms of apparatus for the primary unit should be reduced.

Said objects are achieved, with regard to the hydrostatic transmission, by means of the combination of features disclosed herein and, with regard to the method, by means of the combination of features disclosed herein.

SUMMARY

The claimed hydrostatic transmission is provided for a traction drive which has an internal combustion engine, for example a diesel engine, and an output, for example an axle or a wheel. The hydrostatic transmission has a driveshaft, which is couplable to the internal combustion engine of the traction drive, of a primary unit which operates as a pump during traction operation, and at least one secondary unit, which is couplable to an output of the traction drive and which operates as a motor during traction operation. A primary unit may be assigned one or more secondary units, for example four secondary units on two axles and four wheels in the case of a field sprayer, or one secondary unit in the case of a forklift truck. The primary unit and the secondary unit(s) are fluidically connected to one another by means of two working lines of a closed hydraulic circuit. The primary unit is adjustable in terms of its swept volume and is preferably an axial piston machine with adjustable pivot angle. The hydrostatic transmission furthermore has an electrical control unit by means of which a braking operation can be controlled or controlled in closed-loop fashion, in which braking operation a braking torque of the secondary unit(s) which act(s) as (a) pump(s) is supported by means of the primary unit, which acts as a motor, on the driveshaft of said primary unit. With regard to the traction drive as a whole, the braking torque of the output is thus supported on the internal combustion engine via the hydrostatic units. According to the disclosure, during pump operation, the drive mechanism of the primary unit is acted on in the direction of a decrease of its pivot angle by forces which are dependent on a pressure difference between the two working lines and on a rotational speed of the driveshaft and on the pivot angle of the primary unit. The primary unit thus exhibits load-sensing characteristics. Furthermore, according to the disclosure, in the control unit, there is stored a corresponding characteristic map in which various pressure differences and various rotational speeds are assigned a respective pivot angle or a respective swept volume, which pivot angle or swept volume is controllable by the control unit during the braking operation. It can thereby be ensured that the internal combustion engine does not overspeed at any time. Furthermore, based on the consideration of the characteristic map, no feedback of the pivot angle of the primary unit is required. Thus, rather than primary units with closed-loop position control, such as can be found for example in agricultural machines, use is made according to the disclosure of load-sensing primary units, which are normally somewhat less expensive. These may for example also be used in agricultural machines.

In the case of a load-sensing primary unit, the adjustment device for the swept volume may be designed such that a setting piston of the adjustment device is, in a manner dependent on a setpoint signal, acted on with a setting pressure which is predefined for example by a proportionally adjustable pressure-reducing valve. Since the resetting force counter to which the setting piston must perform work is dependent not only on the force, which becomes greater with increasing swept volume, of one or more resetting springs but also on the operating pressure and on the rotational speed, a particular actuation of the pressure-reducing valve is not assigned an entirely determined swept volume.

With regard to the hydrostatic transmission according to the disclosure, which does not comprise the internal combustion engine, the rotational speed, which is to be limited, of the crankshaft of the internal combustion engine can be transmitted to the control unit via a signal input of the latter or can be picked off directly at the driveshaft of the primary unit, if the crankshaft and the driveshaft are in one piece, or else can be mathematically determined from a rotational speed of the driveshaft of the primary unit, if a mechanical transmission stage is provided between the crankshaft and the driveshaft.

Further advantageous refinements of the disclosure are described in the dependent patent claims.

It is particularly preferable if the control unit, by means of a setting cylinder of an adjustment device of the primary unit, can control a setting pressure in the direction of an increase of the pivot angle of said primary unit and thus of the swept volume of said primary unit. Here, the dependency of said setting pressure or of a setting pressure deviation on the pressure difference between the two working lines and the rotational speed of the driveshaft and on the pivot angle or on the swept volume of the primary unit is stored in the characteristic map.

In a variant which is simple in terms of apparatus, the setting cylinder is of single-acting design so as to act counter to a spring, such that the setting pressure acts only in the direction of an increase of the pivot angle and of the swept volume, whereas the spring acts in the direction of a decrease of the pivot angle and of the swept volume.

In a preferred refinement of the hydrostatic transmission according to the disclosure, the pivot angle and the swept volume of the primary unit are adjustable in both directions from a zero position. Correspondingly, the pressure differences of the two working lines and the rotational speeds of the driveshaft for the pivot angles and/or the swept volumes in both directions from the zero position are stored in the characteristic map. The traction drive in question can thus, with a constant direction of rotation of the internal combustion engine, be utilized in traction operation in both directions of travel of the mobile working machine, and can correspondingly be braked according to the disclosure in both directions.

In the case of a double-acting setting cylinder, the two setting pressure chambers of which can be charged with the setting pressure or with the setting pressure deviation via the common or a respective electrically adjustable setting pressure valve, the traction drive in question can, with a constant direction of rotation of the internal combustion engine, be utilized in traction operation in both directions of travel of the mobile working machine, and correspondingly braked according to the disclosure in both directions. Here, a spring arrangement is provided on both sides, which spring arrangement acts in the direction of a central position in which the pivot angle and the swept volume are zero.

To permit a high-power braking operation, it is preferable if in each case one pressure-limiting valve is arranged on both working lines. A first part of the braking power can be dissipated via the pressure-limiting valve in question, whereas a second part of the braking power can be dissipated via the primary unit and furthermore via the internal combustion engine. The braking power that can be realized is particularly high if the first part is greater than the second part.

If, during the high-power braking operation, the volume flow via the primary unit increases, the volume flow via the related pressure-limiting valve decreases. Thus, the pressure in the working line at high pressure can fall. To minimize this pressure-reducing or to keep the pressure approximately constant, pressure-limiting valves are preferred which have a flat characteristic curve with regard to their pressure difference as a function of their passed-through volume flow.

The characteristic map is preferably assigned, or has superimposed thereon, a safety corrective value of the pivot angle or of the swept volume, which safety corrective value gives rise to a reduction of the pivot angle and of the swept volume or is subtracted from the pivot angle. In particular, the safety corrective value can be incorporated into the characteristic map. This serves for the compensation of inaccuracies of the characteristic map in particular owing to variance (manufacturing inaccuracies) of the primary unit, with the aim that the internal combustion engine reliably does not overspeed at the start of the braking operation.

In a particularly preferred refinement, the hydrostatic drive according to the disclosure has a closed-loop controller, the input variable of which is a rotational speed difference between, on the one hand, an actual rotational speed of the internal combustion engine or a variable derived from the former, in particular the actual rotational speed of the primary unit, and, on the other hand, a maximum rotational speed of the internal combustion engine or a variable correspondingly derived from the former. The output variable of the closed-loop controller is a corrective value of the pivot angle or of the swept volume, which corrective value is added to a pilot-controlled pivot angle or a pilot-controlled swept volume. Since the pilot-controlled value always lies below the maximum rotational speed of the internal combustion engine owing to the safety corrective value, it is thereby achieved that the internal combustion engine reliably does not overspeed at the start of the braking operation, and that, thereafter, a rapid and accurate approximation of the actual rotational speed to the maximum rotational speed of the internal combustion engine occurs by means of the closed-loop controller. The closed-loop controller is preferably a PID closed-loop controller. The control unit preferably has the closed-loop controller.

To be able to utilize the hydrostatic transmission according to the disclosure in different situations in which the internal combustion engine, according to the prior art, could overspeed, the control unit may be refined such that a braking operation is initiated either by means of an operating element, for example brake pedal, in particular via an input for a signal line of the operating element, or on the basis of automatic monitoring of the traveling speed of the mobile working machine, in particular an input for a signal of a speed sensor, or on the basis of automatic monitoring of the rotational speed of the internal combustion engine or of the variable derived from the former.

The secondary unit is preferably also formed with an adjustable pivot angle and thus swept volume. This may be adjusted for example in a manner dependent on the operating element.

The adjustment device may be an electrical directly controlled adjustment device in which a setting pressure in a setting cylinder is predefined by an electrically adjustable pressure-reducing valve (EV adjustment with a single pressure-reducing valve and a directional valve or ET adjustment with two electrically adjustable pressure-reducing valves).

The method according to the disclosure for the control or closed-loop control of a braking operation with an above-described hydrostatic transmission has the steps:

pivoting the primary unit back to a small pivot angle or a small swept volume, for example to approximately 10% of the maximum pivot angle or of the maximum swept volume, and performing pilot control of the pivot angle or of the swept volume on the basis of the characteristic map.

The two steps may be performed in the stated sequence, whereby overspeeding of the internal combustion engine is prevented with the greatest possible reliability. The two steps may be performed simultaneously, whereby time is saved and the braking operation can be initiated quickly.

In a particularly preferred refinement of the method, closed-loop control of the pivot angle or of the swept volume is performed.

The closed-loop control is preferably performed through determination of a corresponding corrective value in a manner dependent on a rotational speed difference between, on the one hand, an actual rotational speed of the internal combustion engine, or a variable derived from the former, in particular the actual rotational speed of the primary unit, and, on the other hand, a maximum rotational speed of the internal combustion engine, or a variable correspondingly derived from the former, and by addition of the corrective value to a pilot-controlled pivot angle or to a pilot-controlled swept volume.

In a preferred refinement of the method according to the disclosure, advance initiation of the braking operation is performed by means of a driver demand or on the basis of an overshooting of the rotational speed of the internal combustion engine (actual rotational speed exceeds a maximum admissible rotational speed) or on the basis of an overshooting of a traveling speed (traveling speed exceeds a desired or maximum admissible traveling speed).

An exemplary embodiment of the hydrostatic transmission according to the disclosure and of a drive according to the disclosure are illustrated in the drawings. The disclosure will now be discussed in more detail on the basis of the figures of said drawings.

DETAILED DESCRIPTION

Figure 1:
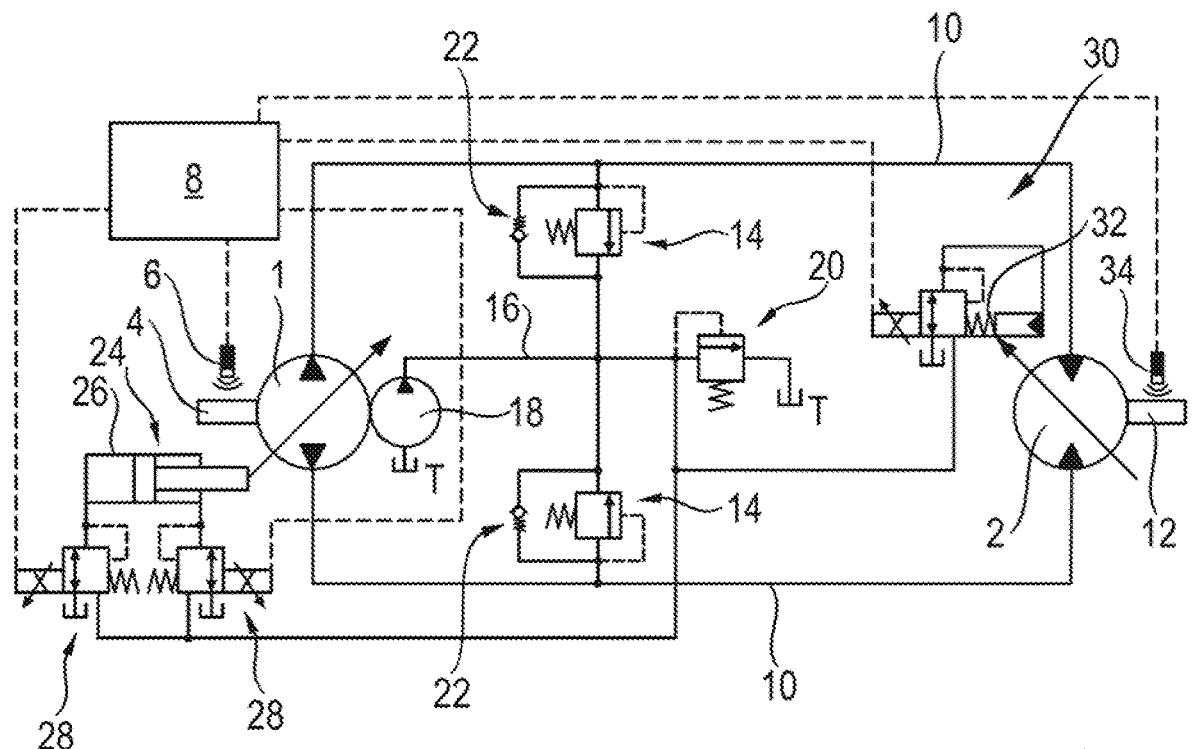
FIG. 1 shows a circuit diagram of the hydrostatic transmission according to the disclosure as per the exemplary embodiment.

FIG. 1 shows a circuit diagram of the hydrostatic transmission according to the disclosure. Said transmission has a primary unit 1 and a secondary unit 2, which are both designed with an adjustable swept volume. The primary unit 1 is an axial piston machine, to the driveshaft 4 of which there is rotationally conjointly coupled a crankshaft of a diesel engine (not shown). The rotational speed of the driveshaft 4 is monitored by means of a rotational speed sensor 6 and an electrical control unit 8. The rotational speed of the crankshaft of the diesel engine is thus also indirectly monitored.

The primary unit 1 is fluidically connected to the secondary unit 2 via a closed hydraulic circuit, which has two working lines 10. An output (not shown) is rotationally conjointly coupled to a driveshaft 12 of the secondary unit 2. The output is for example a differential transmission of a driven axle of the mobile working machine.

The hydrostatic transmission according to the disclosure as per FIG. 1 thus forms, together with the diesel engine and the output, a traction drive of a mobile working machine. During traction operation, the driveshaft 4 of the primary unit 1 serves as a driveshaft, and the primary unit 1 operates as a pump, whereas the secondary unit 2 operates as a motor, and the driveshaft 12 of the secondary unit 2 is an output shaft.

During braking operation of the hydrostatic transmission according to the disclosure, the output is supported, via the driveshaft 12 and via the secondary unit 2 operating as a pump and via one of the two working lines 10 and via the primary unit 1 operating as a motor and via the driveshaft 4 of the primary unit 1, on the diesel engine, which is then cranked and, by means of its friction and acceleration forces of the pistons, dissipates at least a part of the braking energy of the mobile working machine.

On each working line 10 there is provided a pressure-limiting valve 14, via which the respective working line 10 can be relieved of pressure to a feed line 16. The latter is filled with feed pressure medium from a tank T by a feed pump 18, which is coupled rotationally conjointly to the driveshaft 4 of the primary unit 1. Furthermore, the feed line 16 can be relieved of pressure to a tank T via a pressure-limiting valve 20.

The feed line 16 is connected via a respective spring-loaded check valve 22 to the two working lines 10, such that the respectively low-pressure-conducting working line 10 can possibly be supplied with additional pressure medium from the feed line 10. For this purpose, the opening directions of the two check valves 22 are directed from the feed line 16 to the respective working line 10.

The adjustment of the swept volume of the primary unit 1 is realized by means of an adjustment device 24. The latter has a double-acting setting cylinder 26, the two pressure chambers of which act counter to one another on a setting piston which is coupled to a swashplate of the axial piston machine 1. Each of the two pressure chambers can be charged with pressure medium from the feed line 16 via a separate setting pressure valve 28. The two setting pressure valves 28 are electrically adjusted by the control unit 8.

Furthermore, the adjustment device 24 has a spring arrangement (not shown) by means of which the piston of the setting cylinder 26 and the swashplate of the primary unit 1 are preloaded into a central position. From there, the primary unit 1 can be adjusted in both directions. Since the primary unit 1 permits four-quadrant operation, forward travel and forward braking and reverse travel and reverse braking are possible with the hydrostatic transmission according to the disclosure.

In the exemplary embodiment shown, as already mentioned, the secondary unit 2 is also of adjustable design. For this purpose, use is made of an adjustment device 30 which has a valve with an electrical actuator which is likewise actuated by the control unit 8. Here, the adjustment device 30 has a feedback spring 32, such that closed-loop control of the pivot angle of the secondary unit 2 is possible.

Figure 2:
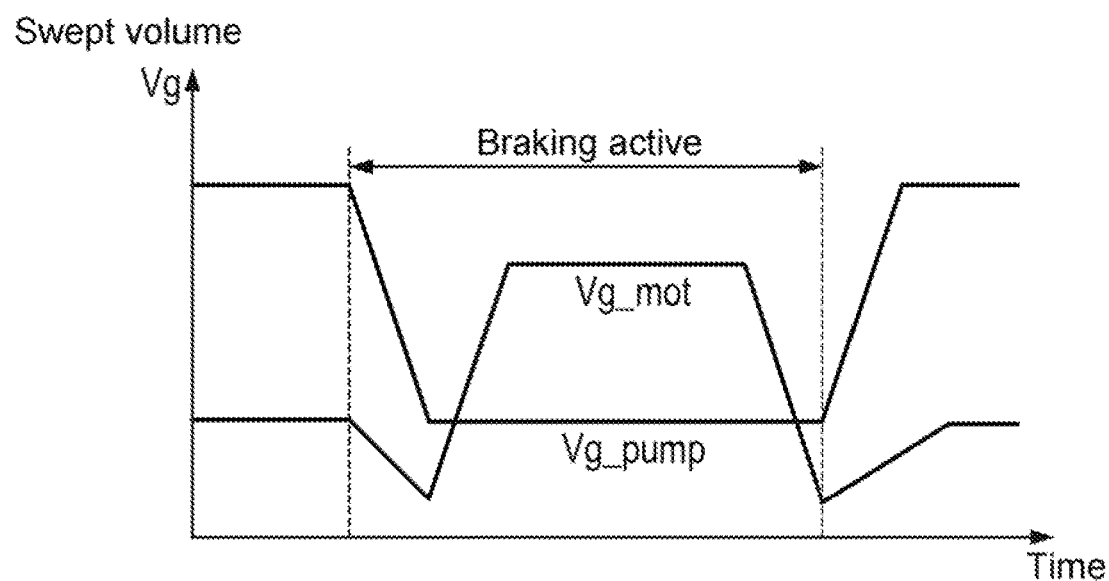
FIG. 2 shows a diagram of the swept volumes of the primary unit and of the secondary unit of the hydrostatic transmission from FIG. 1 during the braking operation.

FIG. 2 shows, in a diagram, the basic profile with respect to time of the swept volumes Vg_pump, Vg_mot of the primary unit 1 and of the secondary unit 2, firstly upon a transition from traction operation into braking operation and then upon a transition from braking operation back into traction operation. Such a braking operation by means of the hydrostatic transmission according to the disclosure may be initiated by means of:

a) transmission of a signal from an operating element actuated by a driver, for example a brake pedal, to the control unit 8, b) a rotational speed of the diesel engine which constitutes an upper limit value for the load of the diesel engine, or a setpoint rotational speed which should not be exceeded and which, for example for comfort reasons, is lower than the limit-value rotational speed and which has been determined by the rotational speed sensor 6 and by the control unit 8, c) a limit-value traveling speed v_veh of the mobile working machine that has been determined indirectly by a rotational speed sensor 34 of the driveshaft 12 of the secondary unit 2 and transmitted to the control unit 8.

The braking operation is controlled, or controlled in closed-loop fashion, by the control unit 8. For this purpose, firstly, the pivot angle angle_pump and thus the swept volume Vg_pump of the primary unit 1 is reduced in a short time to a low value. Said low value may amount to for example approximately 10% of the maximum pivot angle angle_pump_max or of the maximum swept volume Vg_pump_max of the primary unit 1. Thus, the diesel engine is reliably protected against an excessively high rotational speed n_eng because said diesel engine, owing to the inertia, cannot be accelerated to too high a rotational speed in the short time of the pivoting-back of the primary unit 1. Thus, the pressure in the working line 10 that now conducts high pressure increases quickly, and the corresponding high-pressure valve 14 opens a connection to the feed line 16.

The control unit 8 thereupon actuates the secondary unit 2 via the adjustment device 30 such that the pivot angle and thus the swept volume Vg_mot of said secondary unit are increased. Here, the pivot angle angle_pump of the primary unit 1 is also increased again somewhat (not illustrated), whereby the diesel engine is accelerated and a part of the braking power is dissipated via the latter. To maximize this rotational speed of the diesel engine and to not exceed a permissible maximum rotational speed in the process, the control and closed-loop control discussed with reference to the following figures is used.

Figure 3:
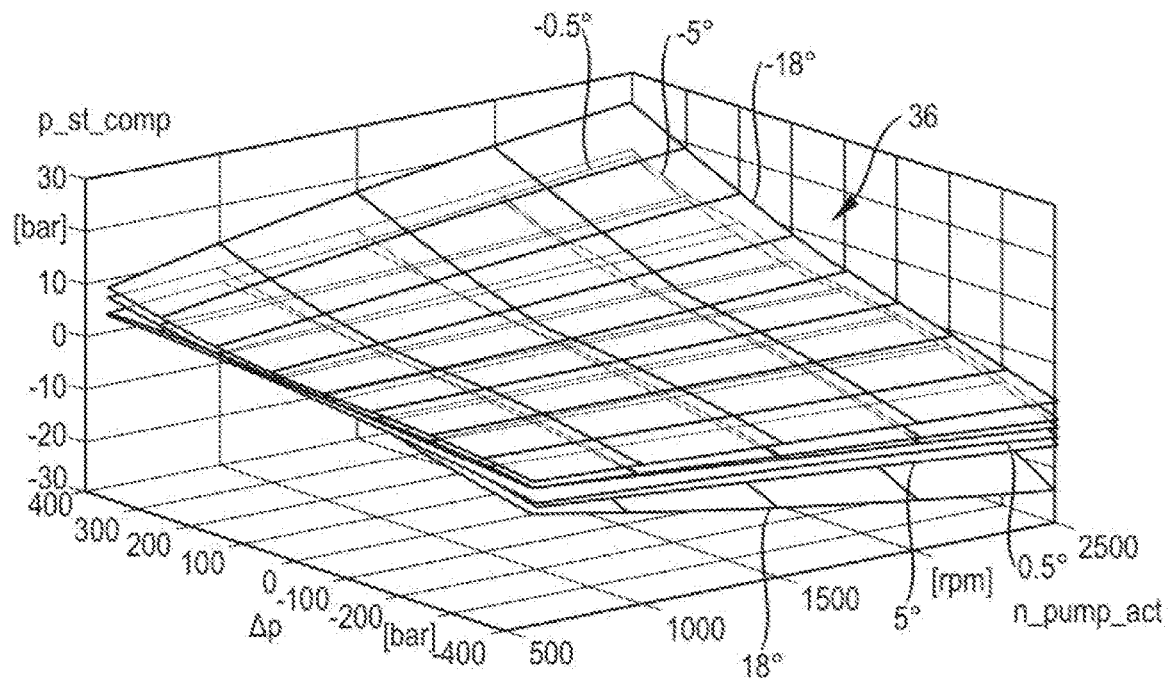
FIG. 3 shows a characteristic map of the primary unit of the hydrostatic transmission from FIG. 1.

FIG. 3 shows a characteristic map 36 of the primary unit 1 which, according to the disclosure, is designed as a load-sensing unit. The characteristic map 36 represents the influence of the pressure difference $\Delta p$ between the two working lines 10 and of the actual rotational speed n_pump_act and furthermore of the pivot angle angle_pump of the primary unit 1 on the setting pressure p_st prevailing in the setting cylinder 24 (cf. FIG. 1). More specifically, the relationship is illustrated such that the pressure difference $\Delta p$ of the two working lines 10 is plotted along a first axis, wherein for example the positive pressure differences $\Delta p$ represent overrun operation and the negative pressure differences $\Delta p$ represent the braking operation according to the disclosure. The actual rotational speed of the driveshaft 4 n_pump_act of the primary unit 1 is plotted on a further axis. The different surfaces of the surface set shown apply for example for three positive and three negative pivot angles angle_pump of the swashplate of the primary unit 1. Plotted on the vertical axis is a setting pressure deviation p_st_comp that is required for maintaining the pivot angle angle_pump at the respective operating point. Here, the positive pressure values in the abovementioned example represent overrun operation, whereas the negative pressure values apply for the braking operation according to the disclosure. This means that, upon the initiation of the braking operation, in the case of the adjustment device 24 discussed with reference to FIG. 1, a change of the pressure chamber that is charged with setting pressure medium p_st is required.

The characteristic map 36 is stored in the control unit 8 (cf. FIG. 1), such that, by means of a pressure sensor (not shown) provided on each of the working lines 10, the control unit 8 can control every desired pivot angle angle_pump by virtue of the corresponding setting pressure deviation p_st_comp being set through corresponding actuation of the setting pressure valves 28. Here, by contrast to the hydrostatic transmissions of the prior art, no feedback of the pivot angle angle_pump of the primary unit 1 is necessary. Pressure sensors can also be omitted. This is because the pressure that takes effect in the corresponding working line can be determined on the basis of the opening pressure and the characteristic curve of a pressure-limiting valve 14.

Figure 4:
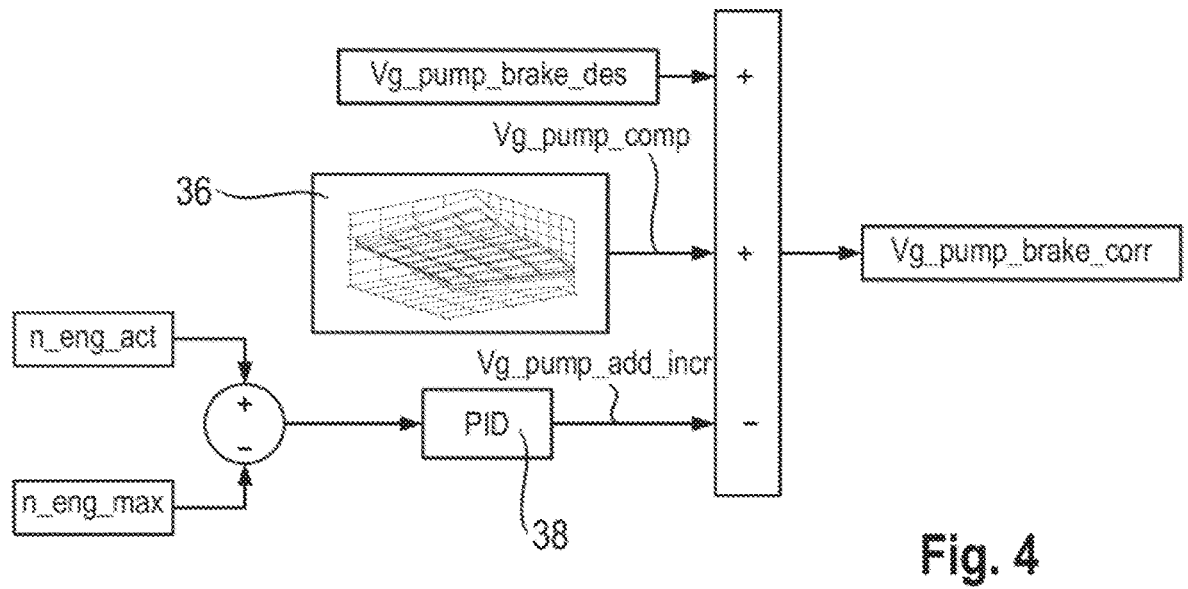
FIG. 4 shows a schematic overview of the characteristic-map-based pilot control with additional closed-loop control of the swept volume of the primary unit during the braking.

As a result of variance in the manufacture of primary units 1 and as a result of other factors such as wear and viscosity of the pressure medium used, small deviations of the various physical primary units 1 from the characteristic map 36 are possible, such that the above-described characteristic-map-based control is utilized as pilot control and is additionally refined as per FIG. 4. In said figure, the characteristic map 36 from FIG. 3 is illustrated in the central region, which characteristic map is used to assign a corresponding corrective value p_st_comp to the setting pressure p_st. A safety corrective value is also incorporated into the characteristic map 36 in order to allow for the said possible variances of the characteristic of the various primary units 1 and in order, by means of the pilot control, which is simple in terms of apparatus, by means of the characteristic map 36, to always set a swept volume Vg_pump_comp in the case of which the diesel engine reliably does not overspeed and dissipates a high but non-critical braking power even in the event of a failure of the functions described below.

Furthermore, closed-loop control is also superposed on the pilot control, which closed-loop control compares the actual rotational speed n_eng_act of the diesel engine with a limit rotational speed n_eng_max, which the maximum admissible rotational speed of the diesel engine or a pre-defined maximum rotational speed lower than the maximum admissible rotational speed, and generates a further corrective value for the setting pressure p_st. Alternatively, it is also possible for the rotational speed n_pump_act of the primary unit 1 to be compared with a converted maximum admissible rotational speed n_pump_max of the primary unit 1 and for the further corrective value for the setting pressure p_st to be generated.

Figure 5:
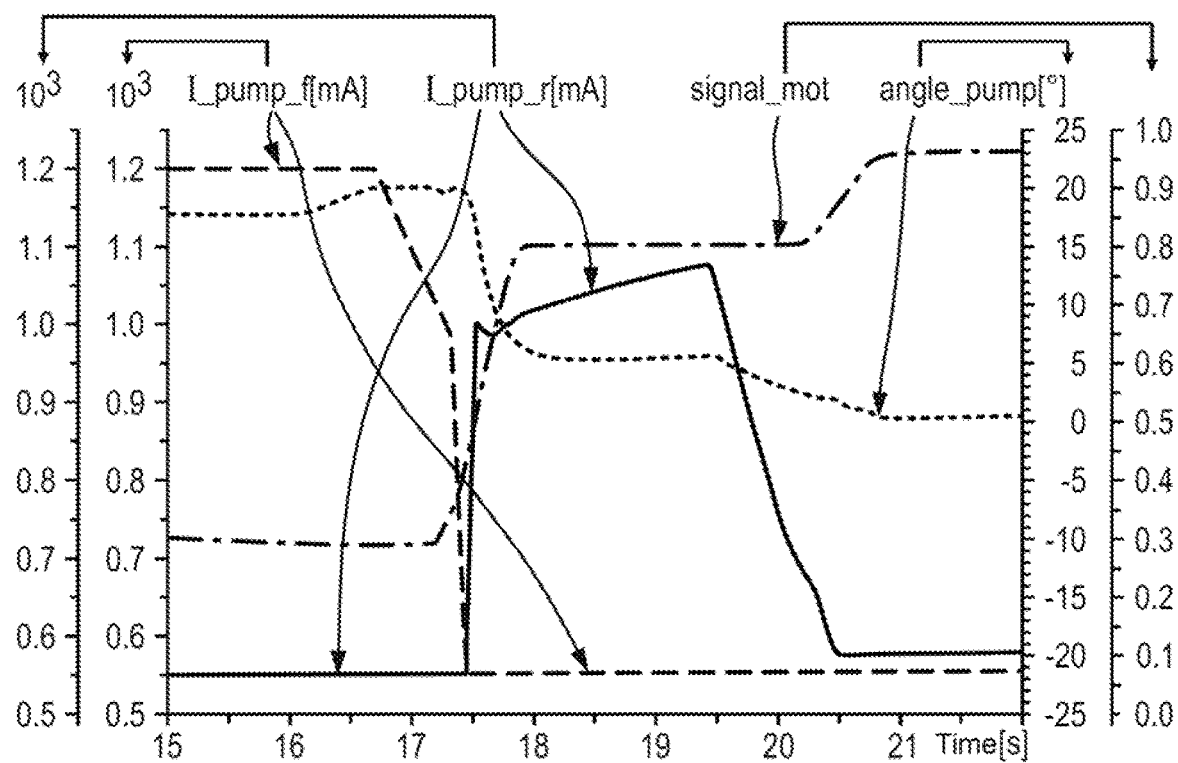
FIG. 5 shows two diagrams of the characteristic-map-based pilot control without additional closed-loop control during the braking operation.
Figure 5:
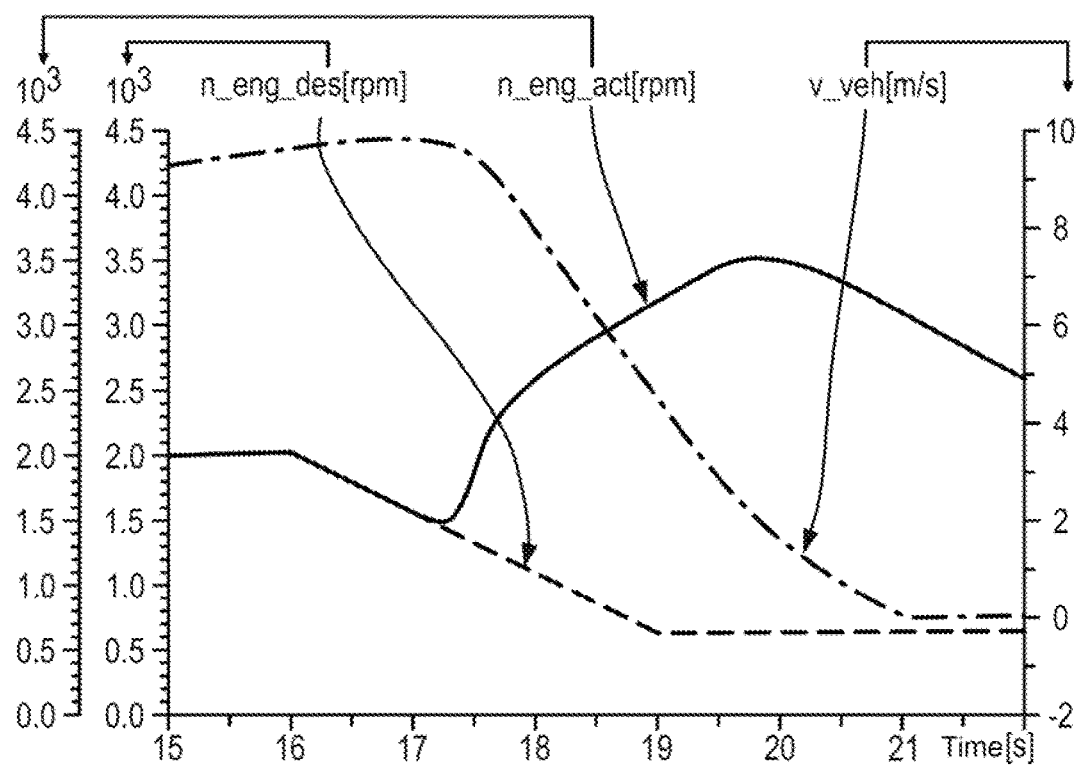

FIG. 5 shows purely the pilot control as per the characteristic map 36 (cf. FIGS. 3 and 4). The primary unit 1 is thus already pivoted into the vicinity of the ideal value. In the illustrated example, the primary unit 1 however still remains at an altogether somewhat excessively large swept volume Vg_pump (displacement volume), which would lead to a somewhat excessively high rotational speed n_eng_act of the diesel engine. In the case of an excessively small pivot angle angle_pump, the braking capability of the diesel engine would be only partially utilized. Thus, although a reliable braking function is duly already basically possible with the described load-sensing primary unit 1, this can however be improved further.

The final deviation from the ideal value is ultimately compensated by means of the superposed closed-loop control with the PID closed-loop controller 38 shown in FIG. 4, which utilizes the "last" actual rotational speed n_eng_act of the diesel engine of its maximum admissible rotational speed n_eng_max as input variable and outputs an increased swept volume Vg_pump_add_incr. Thus, a swept volume Vg_pump_brake_corr that is optimum for the braking operation under the conditions of the physical primary units 1 is determined.

Figure 6:
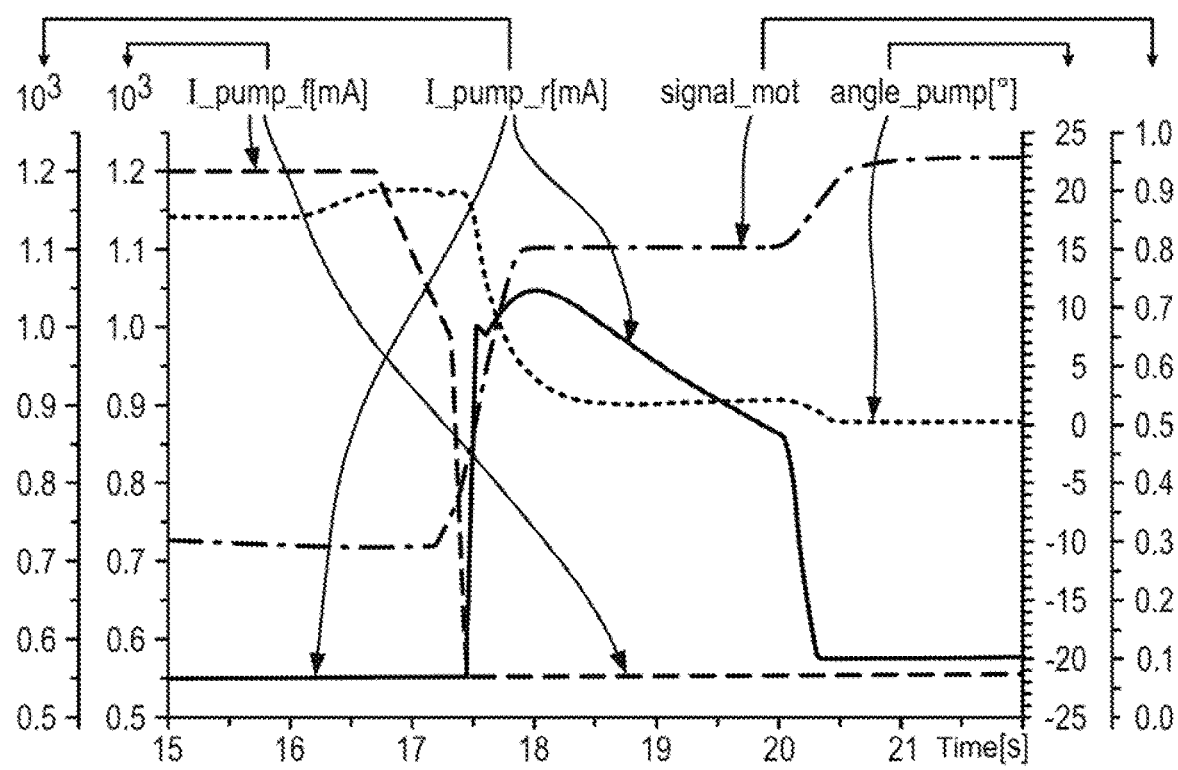
FIG. 6 shows two diagrams of the characteristic-map-based pilot control with additional closed-loop control during the braking operation.
Figure 6:
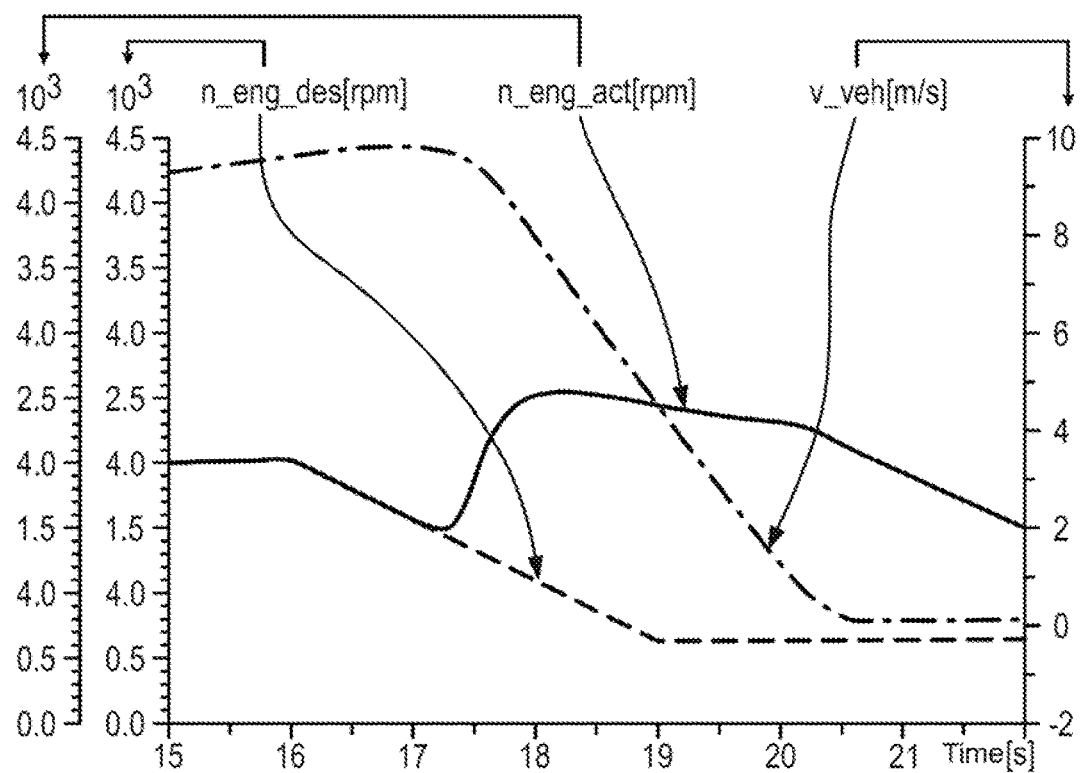

The effect is illustrated by way of example in FIG. 6. Uniform utilization of the diesel engine during the braking operation is realized without the latter reaching the inadmissible rotational speed range.

A hydrostatic transmission is disclosed with which a braking operation can be realized in which at least one traction motor which acts as a pump and which is adjustable in terms of its swept volume is supported via a closed hydraulic circuit on an adjustable axial piston pump, which acts as a motor during the braking operation, and which in turn can be supported on an internal combustion engine. Since overspeeding of the latter should be avoided, a control unit can adjust the pivot angle of the pump in accordance with a characteristic map which represents a relationship between a setting force and a pressure difference of the two working lines of the closed hydraulic circuit, a pump rotational speed and the pivot angle. Thus, characteristic-map-based control of the pivot angle of the pump is possible, wherein feedback of the present pivot angle can be omitted. The pivot angle of the pump is in this case selected such that the internal combustion engine reliably does not overspeed.

This control alone is however often not sufficient to set the desired swept volume of the pump with sufficient accuracy and thus fully utilize the supporting torque of the internal combustion engine for the braking operation, because the characteristic map of the drive mechanism forces is afflicted with a certain tolerance. The characteristic-map-based setting of the pivot angle of the pump is thus advantageously used as pilot control for subsequent closed-loop control of the pivot angle in a manner dependent on the rotational speed of the internal combustion engine. Here, closed-loop control is also superposed on the pilot control, which closed-loop control compares the actual rotational speed of the internal combustion engine nD_ist, which is in particular a diesel engine, with the maximum admissible rotational speed nD_max thereof and generates a further corrective value for the setting pressure. Since a pivot angle at which the internal combustion engine reliably does not overspeed is set with the pilot control, the pivot angle and the swept volume are increased by means of the closed-loop control.

The disclosure will be discussed once again below with a slightly different focus and on the basis of a simplified method:

If an electrical controller identifies that a high-power braking operation is necessary, the swept volume of the hydrostatic primary unit (of the pump) is set such that power is output to the internal combustion engine only to an extent that said internal combustion engine can reliably support said power. Since, during the high-power braking operation, a part of the braking energy is dissipated via in each case one of the two pressure-limiting valves that limit the high pressure, the high pressure is defined within certain limits. The flatter the characteristic curve of the pressure-limiting valves, the greater the accuracy with which the high pressure is known. As a result, the torque that is output to the crankshaft by the pump operating as a motor is, in a good approximation, dependent only on the pivot angle of the pump.

The specialty of a load-sensing pump is that its actual pivot angle constitutes a state of equilibrium between the following main influential factors:
 adjustment force generated by the setting pressure p_St;
 adjustment force dependent on the rotational speed;
 adjustment force dependent on the pressure difference that exists across the pump.

This is technically a significant difference in relation to pump actuation with closed-loop position control, in the case of which there is a linear relationship between actuation signal and pump pivot angle.

Further influential factors such as manufacturing tolerances, aging, oil temperatures, viscosities etc. additionally complicate the characteristics of a pump, in particular the adjustment of a load-sensing pump to a particular pivot angle.

Since it is sought to omit a pivot angle sensor for cost reasons, there is now the challenge to dissipate a part of the braking energy via the internal combustion engine without the latter being caused to overspeed. Here, it is often also necessary to take into consideration that, depending on usage and operating strategy, sometimes the maximum braking power of the internal combustion engine should be fully utilized and sometimes only a part of the braking power of the internal combustion engine should be utilized, for example for reasons relating to noise. In the latter braking situation, the rotational speed of the internal combustion engine is then lower than the maximum admissible rotational speed.

In a pump with closed-loop position control, the specification of different limit rotational speeds of the internal combustion engine does not pose any great difficulties. This is because the following applies: torque=f(pivot angle)=f (actuation signal). By contrast, the challenge is great in the case of a load-sensing pump. Here, the abovementioned influential factors must be taken into consideration in order to set the correct control pressure p_St for the desired pivot angle.

A description will be given below as to how this can be realized relatively easily in the case of a load-sensing hydrostatic primary unit which is adjustable in terms of its swept volume.

The level of braking power that is to be dissipated by the internal combustion engine is defined by the operating strategy. For every internal combustion engine, there is the characteristic relationship that braking power is equal to 2*pi*rotational speed*torque. Since the rotational speed, specifically either a maximum admissible rotational speed or a limit rotational speed desired on the basis of the operating strategy, is predefined as being lower than the maximum admissible rotational speed, in most cases, the torque can be determined from the above relationship. For the hydrostatic primary unit, this means that, on the basis of the known system pressure level during high-powered braking operation, a particular pivot angle must be set.

In the case of the load-sensing pump, the following approach is taken: the dependencies mentioned above are taken into consideration here.

a) Pivot angle pilot control is performed. On the basis of the setpoint rotational speed of the internal combustion engine for the braking operation, an experimentally or theoretically determined characteristic curve is used to determine a setting pressure p_Ctrl_init for the pump, in the case of which a pivot angle is set at which the setpoint rotational speed of the internal combustion engine is not yet reached. In the simplest case, if always the same rotational speed, for example always the maximum rotational speed of the internal combustion engine, applies as the setpoint rotational speed during braking operation, the setting pressure is not determined on the basis of a characteristic map and is not determined on the basis of a characteristic curve, it rather being the case that always the same setting pressure is selected, which reliably leads to a pivot angle at which the rotational speed (non-critical base overrun rotational speed) of the internal combustion engine reliably lies below the setpoint rotational speed.

b) Closed-loop rotational speed control is superposed on the pilot control, which closed-loop rotational speed control has the effect that the supporting power of the internal combustion engine is fully utilized to the defined setpoint rotational speed. This is achieved in that the setting pressure p_Ctrl_speed is calculated from the difference between the setpoint and actual rotational speeds of the internal combustion engine by means of a closed-loop controller (P, PI or PID closed-loop controller).

c) Depending on the usage situation, an additional dynamic component p_ctrl_dyn is added in order to accelerate or assist the pivoting-back or holding of the pump. The dynamic component may be dependent for example on the estimated volume flow which is conducted via the pressure-limiting valves and which is converted, by means of a factor K, into the setting pressure component p_Ctrl_dyn.

From the addition of the individual components, the setting pressure p_Ctrl is calculated, which as conducted as a setting pressure to one or the other setting chamber of the pump in a manner dependent on the direction of travel. Here, it is generally the case that "negative" control pressures also arise. This means that, in the case of a braking operation during forward travel, the setting chamber for reverse travel must be energized, and vice versa, in order to be able to hold the pivot angle of the pump at the desired operating point.

LIST OF REFERENCE DESIGNATIONS

1 Hydrostatic primary unit
2 Hydrostatic secondary unit
4 Driveshaft
6 Rotational speed sensor
8 Control unit
10 Working line
12 Driveshaft
14 Pressure-limiting valve
16 Feed line
18 Feed pump
20 Pressure-limiting valve
22 Check valve
24 Adjustment device
26 Setting cylinder
28 Setting pressure valve
30 Adjustment device
32 Feedback spring
34 Rotational speed sensor
36 Characteristic map
38 Closed-loop controller
angle_pump Pivot angle of the primary unit
angle_pump_max Maximum pivot angle of the primary unit
n_eng_act Actual rotational speed of the internal combustion engine
n_eng_max Maximum admissible rotational speed of the internal combustion engine
n_mot_act Actual rotational speed of the secondary unit
n_pump_act Actual rotational speed of the primary unit
n_pump_max Rotational speed of the primary unit derived from the maximum rotational speed of the internal combustion engine
p_st Setting pressure of the primary unit
p_st_comp Setting pressure deviation of the primary unit
Vg_mot Swept volume of the secondary unit
Vg_pump Swept volume of the primary unit
Vg_pump_add_incr Increased swept volume of the primary unit for braking
Vg_pump_brake Pilot-controlled swept volume of the primary unit for braking
Vg_pump_brake_corr Setpoint swept volume of the primary unit for braking
Vg_pump_comp Swept volume deviation of the primary unit
Vg_pump_max Maximum swept volume of the primary unit
v_veh Traveling speed
$\Delta$n_eng Rotational speed difference between the setpoint rotational speed and the actual rotational speed of the internal combustion engine
$\Delta$p Pressure difference between the two working lines
T Tank

What is claimed is:

1. A hydrostatic transmission for a traction drive of a mobile working machine, comprising:
a hydrostatic primary unit including a driveshaft coupled to an internal combustion engine of the traction drive, the primary unit, in terms of its swept volume, is adjustable by actuation with a variable setting pressure, and the primary unit is configured as an axial piston machine having an adjustable pivot angle;
at least one hydrostatic secondary unit coupled to an output of the traction drive;
two working lines of a closed circuit each configured to fluidically connect the primary unit and the at least one secondary unit; and
an electrical control unit configured to control the adjustable pivot angle of the primary unit during a braking operation of the hydrostatic transmission,
wherein, during a pump operation of the primary unit, forces opposing the setting pressure that are dependent on (i) a pressure difference between the two working lines, (ii) a rotational speed of the driveshaft, and (iii) the pivot angle of the primary unit act in a direction of a decrease in the pivot angle of the primary unit,
wherein, in the electrical control unit, there is stored a characteristic map of the primary unit in which a setting pressure deviation, the pressure difference, and the rotational speed of the driveshaft are assigned a respective pivot angle or a respective swept volume of the primary unit, and wherein the setting pressure deviation is the setting pressure for maintaining the pivot angle of the primary unit.

2. The hydrostatic transmission according to claim 1, wherein:
the setting pressure is controlled by the electrical control unit with an electrical setting pressure valve and a setting cylinder of an adjustment device of the primary unit,
the setting pressure acts in a direction of an increase of the pivot angle of the primary unit, and
the dependency of the setting pressure deviation on the pressure difference of the two working lines and on the rotational speed of the driveshaft and on the pivot angle or on the swept volume is stored in the characteristic map.

3. The hydrostatic transmission according to claim 2, wherein:
the pivot angle and the swept volume of the primary unit are adjustable in both directions from a zero position, and
the setting pressure deviation, the pressure differences between the two working lines, and the rotational speeds of the driveshaft for the pivot angles or the swept volumes in both directions from the zero position are stored in the characteristic map.

4. The hydrostatic transmission according to claim 2, wherein the setting cylinder is double-acting and has two setting pressure chambers configured to be charged with the setting pressure by the electrical control unit using the electrical setting pressure valve.

5. The hydrostatic transmission according to claim 2, wherein the adjustment device is a directly controlled electrohydraulic adjustment device with a predefined setting pressure.

6. The hydrostatic transmission according to claim 1, further comprising:
a first pressure-limiting valve arranged on a first working line of the two working lines;
a second pressure-limiting valve arranged on a second working line of the two working lines,
wherein the braking operation is a high-power braking operation in which a first part of the braking power is dissipated via one of the first and the second pressure-limiting valves, while a second part of the braking power is dissipated via the primary unit.

7. The hydrostatic transmission according to claim 5, wherein the first and the second pressure-limiting valves each have a flat characteristic curve with regard to their pressure difference as a function of their passed-through volume flow.

8. The hydrostatic transmission according to claim 1, wherein:
a safety corrective value of the pivot angle or of the swept volume is assigned to or superposed on the characteristic map, and
the safety corrective value effects a decrease of the pivot angle or of the swept volume.

9. The hydrostatic transmission according to claim 1, further comprising:
a closed-loop controller, an input variable of which is a rotational speed difference between an actual rotational speed of the internal combustion engine, or a derived rotational speed difference that is derived from the rotational speed difference, and a limit rotational speed of the internal combustion engine, or a derived limit rotational speed that is derived from the limit rotational speed, and an output variable of which is a corrective value for the pivot angle pilot-controlled by the characteristic map or for the swept volume pilot-controlled by the characteristic map,
wherein the corrective value is added to the pivot angle or swept volume.

10. The hydrostatic transmission according to claim 1, wherein the electrical control unit is configured such that the braking operation is initiated by an operating element of the mobile working machine or based on automatic monitoring of a traveling speed of the mobile working machine or of a derived traveling speed that is derived from the traveling speed or based on automatic monitoring of the rotational speed of the internal combustion engine or of a derived rotational speed that is derived from the rotational speed of the internal combustion engine.

11. A method for control or closed-loop control of a braking operation with a hydrostatic transmission for a traction drive of a mobile working machine, the method comprising:
pivoting a primary unit back and thus performing pilot control of a pivot angle of the primary unit or of a swept volume of the primary unit based on a characteristic map,
wherein the hydrostatic transmission includes
the primary unit including a driveshaft coupled to an internal combustion engine of the traction drive, the primary unit, in terms of its swept volume, is adjustable by actuation with a variable setting pressure, and the primary unit is configured as an axial piston machine having the adjustable pivot angle,
at least one secondary unit coupled to an output of the traction drive,
two working lines of a closed circuit each configured to fluidically connect the primary unit and the at least one secondary unit, and
an electrical control unit configured to control the adjustable pivot angle of the primary unit during the braking operation of the hydrostatic transmission,
wherein, during a pump operation of the primary unit, forces opposing the setting pressure that are dependent on (i) a pressure difference between the two working lines, (ii) a rotational speed of the driveshaft, and (iii) the pivot angle of the primary unit act in a direction of a decrease in the pivot angle of the primary unit,
wherein, in the electrical control unit, there is stored the characteristic map of the primary unit in which a setting pressure deviation, the pressure difference, and the rotational speed are assigned a respective pivot angle or a respective swept volume of the primary unit, and
wherein the setting pressure deviation is the setting pressure for maintaining the pivot angle of the primary unit.

12. The method according to claim 11, further comprising:
performing closed-loop control of the pivot angle or of the swept volume.

13. The method according to claim 12, wherein the closed-loop control is performed by:
determining a corresponding corrective value in a manner dependent on a rotational speed difference between an actual rotational speed of the internal combustion engine, or a derived rotational speed difference derived from the rotational speed difference, and a maximum rotational speed of the internal combustion engine, or a derived maximum rotational speed derived from the maximum rotational speed; and adding the corrective value to a pilot-controlled pivot angle or to a pilot-controlled swept volume.

14. The method according to claim 13, further comprising:

initiating the braking operation based on a driver demand or based on an overshooting of the actual rotational speed of the internal combustion engine or of the derived rotational speed or based on an overshooting of a traveling speed or of a derived overshooting of the traveling speed derived from the overshooting of the traveling speed.

\* \* \* \* \*